US008442516B2

(12) United States Patent
Swaminathan et al.

(10) Patent No.: US 8,442,516 B2
(45) Date of Patent: *May 14, 2013

(54) WORLD MODE SCANNING CONTROL

(75) Inventors: Arvind Swaminathan, San Diego, CA (US); Francis Ming-Meng Ngai, Louisville, CO (US); Ameya Rajendraprasad Kasbekar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/328,966

(22) Filed: Dec. 16, 2011

(65) Prior Publication Data
US 2012/0258710 A1    Oct. 11, 2012

Related U.S. Application Data

(63) Continuation-in-part of application No. 13/082,926, filed on Apr. 8, 2011.

(51) Int. Cl.
*H04W 24/00*    (2009.01)
(52) U.S. Cl.
USPC ..... 455/423; 455/432.1; 455/436; 455/435.2; 455/434; 370/331; 370/252
(58) Field of Classification Search ............... 455/432.1, 455/436, 435.2, 434; 370/252
See application file for complete search history.

(56) References Cited

U.S. PATENT DOCUMENTS

| 7,085,569 | B2 * | 8/2006 | Ohmori ................... 455/435.2 |
| 7,593,727 | B2 * | 9/2009 | Zhao et al. ................ 455/432.1 |
| 8,073,441 | B1 | 12/2011 | Unger et al. |
| 2004/0087305 | A1 * | 5/2004 | Jiang et al. ................ 455/432.1 |
| 2004/0203778 | A1 * | 10/2004 | Kuo et al. .................... 455/436 |
| 2006/0189312 | A1 * | 8/2006 | Kubo et al. ................... 455/434 |
| 2007/0004405 | A1 | 1/2007 | Buckley et al. |
| 2010/0046385 | A1 * | 2/2010 | Kamei et al. ................ 370/252 |
| 2010/0099399 | A1 | 4/2010 | Nayak et al. |
| 2012/0258709 | A1 | 10/2012 | Swaminathan et al. |

FOREIGN PATENT DOCUMENTS

| EP | 2148540 A2 | 1/2010 |
| EP | 2282587 A1 | 2/2011 |
| GB | 2352135 A | 1/2001 |
| WO | WO2008087251 A1 | 7/2008 |

OTHER PUBLICATIONS

International Search Report and Written Opinion—PCT/US2012/032819, International Search Authority—European Patent Office, Jun. 8, 2012.

* cited by examiner

*Primary Examiner* — Charles Shedrick
(74) *Attorney, Agent, or Firm* — Stanton Braden (57) ABSTRACT

A method and apparatus for world-mode devices capable of managing technology selection for multimode roaming between existing access technologies, as well as possible future access technologies, in a manner that eliminates wasteful scanning for non-existent systems and reduces roaming charges is disclosed. The method allows the device an opportunity to reacquire its home system before scanning for available roaming network resources in a prioritized manner that mitigates roaming costs, while conserving power and acquisition delays by eliminating scanning for non-existent system types. A minimum OOS duration is imposed on a home system before acquisition of a roaming partner to provide more time to re-acquire the home system. Preferred partner scanning and acquisition reduces roaming charges, while scanning for non existent systems is eliminated altogether.

22 Claims, 4 Drawing Sheets

WORLD MODE SCANNING CONTROL

The present application is a continuation-in-part of, and claims priority to, U.S. Application Ser. No. 13/082,926, filed Apr. 8, 2011, entitled "World Mode Scanning Control," assigned to the assignee hereof, the disclosure of which are hereby expressly incorporated by reference herein.

BACKGROUND

1. Field

The present invention relates generally to wireless communications, and more specifically to techniques for optimizing the selection of wireless communications systems.

2. Background

With the deployment of a multitude of wireless technologies worldwide and support for these technologies in mobile multimode devices or entities, there is a growing need for seamless system selection toward the goal of global roaming. Furthermore, any particular geographic region may support mixed technologies and networks, such as 3rd Generation Partnership Project (3GPP) and 3rd Generation Partnership Project 2 (3GPP2) networks having WCDMA (Wideband Code Division Multiple Access) air interfaces, Global System for Mobile Communications (GSM), or other network technologies such as Universal Mobile Telecommunication System (UMTS) Terrestrial Radio Access (UTRA). World-mode user equipment (UE) devices support Single carrier (1X) radio transmission technology, CDMA2000 EVDO, CDMA2000 1xRTT, GSM and WCDMA.

A mobile multimode device that supports mixed technologies may include multiple databases that are used in selecting optimal networks within a technology. As an example, for 3GPP2 technologies, such as certain Code Division Multiple Access 2000 (cdma2000 or C2K) networks, a Preferred Roaming List (PRL) database which is stored at the User Equipment (UE) provides information about which system/network is preferred in a geographic region for that device. Whether predetermined or programmed via Over-The-Air (OTA) management protocols, the PRL contains information about the preferred networks and the order in which they should be selected for the user. PRLs for 3GPP2 technologies may be structured to have a table associated with each geographical region, which in turn contains a list of system descriptions keyed by System Identifier/Network Identifier (SID/NID) pairs and associated with an acquisition index. The acquisition index may be used as a pointer to an acquisition table which contains an indexed list of RF channels for channel acquisition purposes in the related system.

For 3GPP technologies, such as Global System for Mobile (GSM) and Universal Mobile Telecommunication System (UMTS) Terrestrial Radio Access (UTRA), a differently structured database list of preferred networks, termed Public Land Mobile Networks (PLMNs), is stored in a Subscriber Identity Module (SIM) or Universal Subscriber Identity Module (USIM) of the mobile device. The PLMNs in the database include a Mobile Network Code (MNC) that is used in combination with a Mobile Country Code (MCC) (also known as a "MCC/MNC tuple") to uniquely identify a service operator using a 3GPP technology, such as GSM and UMTS public land mobile networks. Identification of a service operator may begin with the 3GPP approach to system selection based on PLMN lists, which may include 3GPP2 access technology identifiers (ATI), also known as Radio Access Technologies (RATs). A PLMN may identify and may be a concatenation of a MCC and a MNC.

When roaming through geographical locations, it is desirable that a multimode device seamlessly select the best available system, particularly when roaming across areas with different available access technologies (e.g., 3GPP and 3GPP2). When a world-mode device goes Out Of Service (OOS) due to loss of signal, current implementations calls for the device to scan 1x, DO, GSM and WCDMA. However, when a 1x carrier does not have roaming agreements with GSM/WCMDA carriers in the vicinity of the home country or the these networks do not exist in the home country, such as Verizon Wireless in the US, scanning GSM/WCDMA while in the home country is a waste of processing resources and power, and it delays the acquisition of service during power-up and the re-acquisition of service during OOS. Furthermore, during OOS, roaming charges paid by subscribers and carriers are accrued as soon as another non-home network is acquired even though the home network OOS may be transitory and the home network could be re-acquired after a short period of time at no cost. Typically the roaming partner is mostly determined by the position of roaming system in GEO/PRL rather than by the fee structure agreements with the most advantageous roaming partners.

There is therefore a need in the art for world-mode devices to manage technology selection for multimode roaming between existing access technologies, as well as possible future access technologies, in a manner that eliminates wasteful scanning for systems that are far away and considered out of range, i.e., faraway, and reduces roaming charges.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The terms "mobile device", "wireless device" and "user equipment" (UE) as used herein refers to a wireless communication device such as a cellular telephone, wireless terminal, user equipment, laptop computer, High Data Rate (HDR) subscriber station, access terminal, or other personal communication system (PCS) device. The device may be either mobile or stationary.

An algorithm to proactively scan for available network resources in a manner that reduces power consumption and mitigates roaming costs is disclosed. The algorithm provides a faraway preferred partner scanning, and home network re-acquisition wait periods detailed in FIG. 2.

Figure 1:
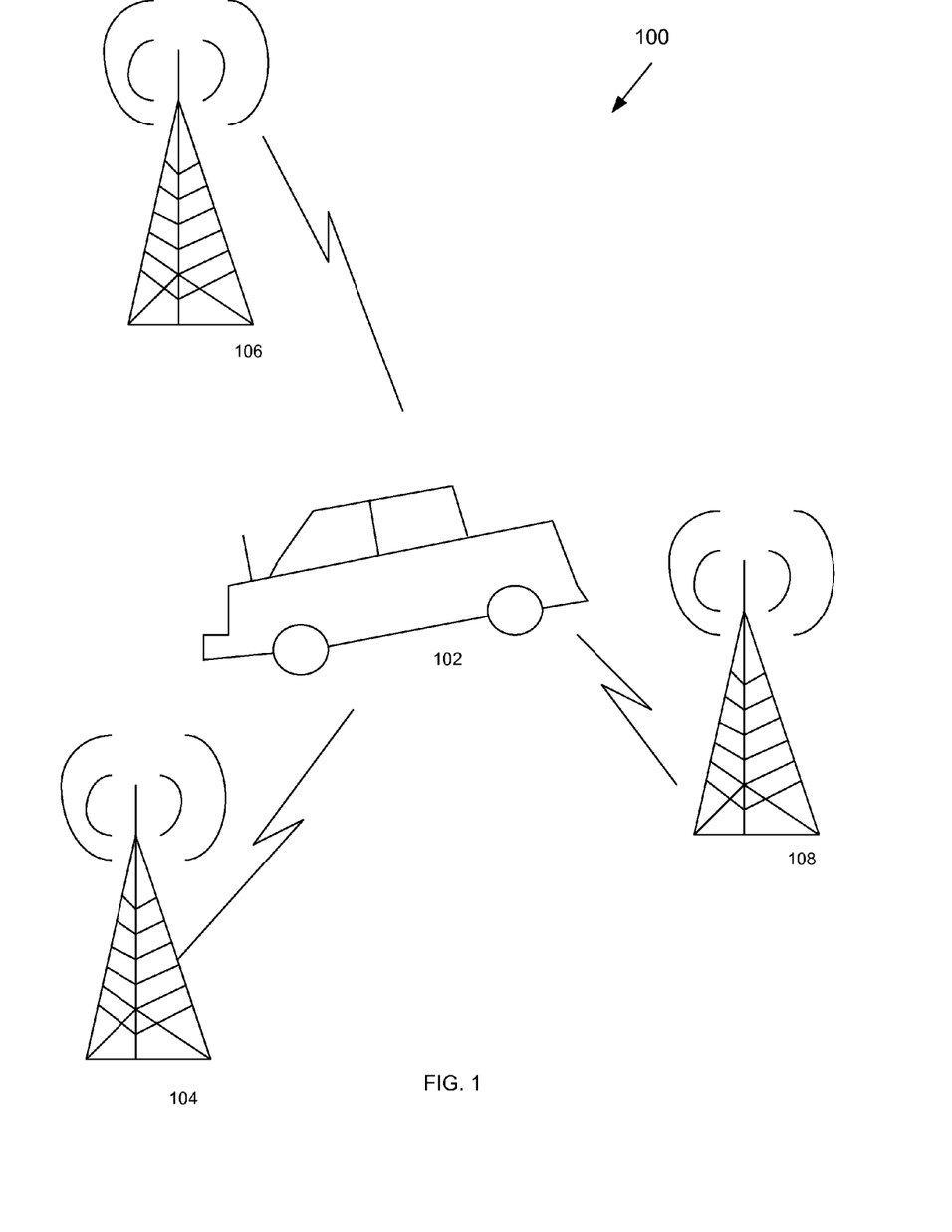
FIG. 1 is a diagram illustrating an example of a broadcast network in which World Mode Scanning Control can be used.

FIG. 1 is a diagram illustrating an example of a wireless communications network in which single path detection and equalizer optimization can be used. As seen in FIG. 1, wireless communications network 100 includes multiple base stations 104, 106 and 108 for transmitting wireless communications signals. Signals and data can be broadcast by base stations 104, 106 and 108 to supply user content and information. For example, streaming video, games or data for other applications may be delivered over the wireless network. A receiver User Equipment (UE) 102 receives the data for consumption by the user. In this example, the receiver 102 is depicted as hosted by a car. However, receiving station 102 should not be limited as such, and can also represent, for example, a person, another mobile entity/device, or a stationary entity/device. Furthermore, the receiver can represent a computer, a laptop computer, a telephone, a mobile telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting single path detection and equalizer optimization. A host system can be stationary or mobile, and it can be a digital device.

Figure 2:
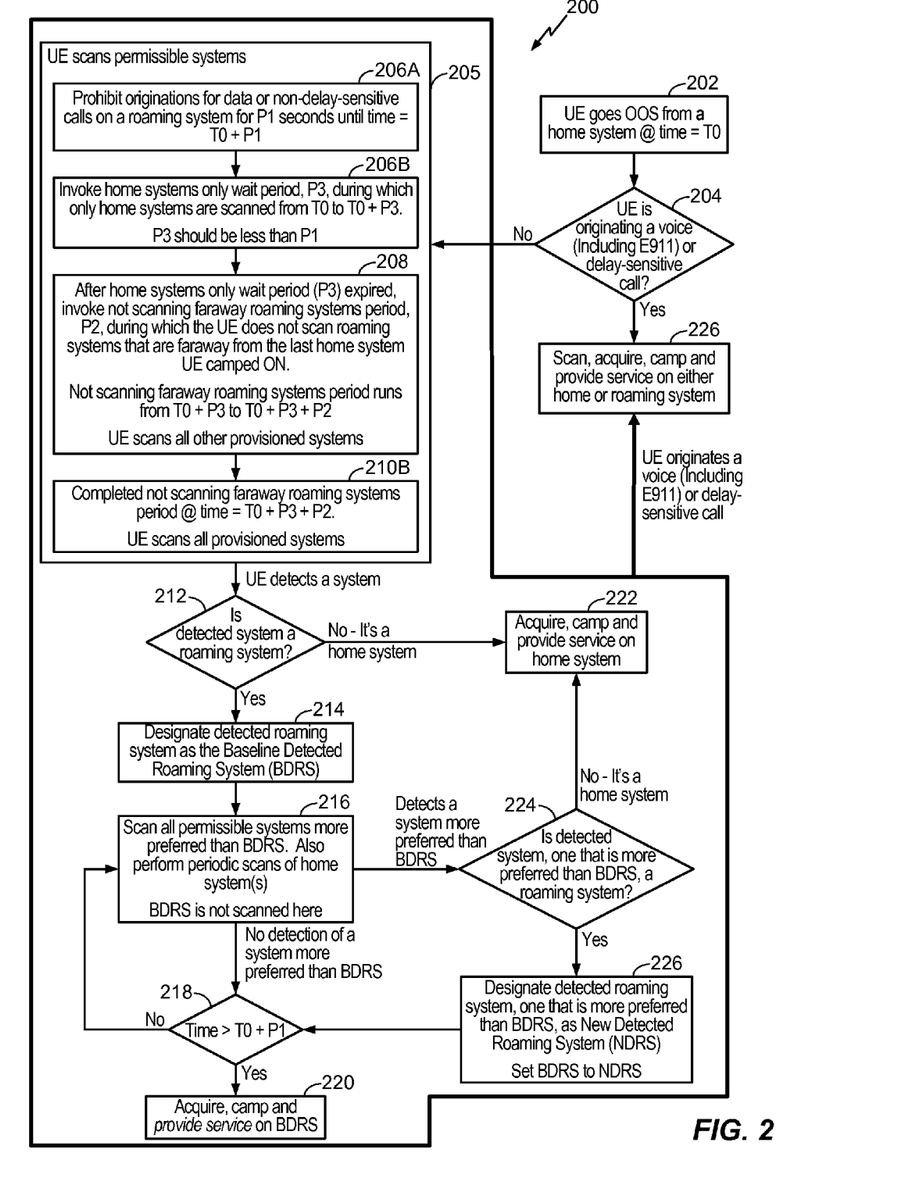
FIG. 2 is an exemplary flowchart illustrating World Mode Scanning Control.

FIG. 2 illustrates an exemplary overview of World Mode Scanning Control. When a UE experiences OOS from a home system, a minimum OOS duration waiting period, P3, is imposed before scanning and acquisition of a roaming partner to provide more time to re-acquire the home system before incurring roaming charges. If the home system cannot be re-acquired after the P3 wait period, preferred partner only scanning is performed for another waiting period, P2, to reduce roaming charges while scanning for faraway systems is eliminated altogether. However, a P1 wait period may run coextensively with a portion of periods P2+P3 where P1>P2+P3 or P1<P2+P3. It should be noted that P1 serves two purposes: (1) a UE cannot "camp" on a roaming system before the P1 period expires; and (2) a UE cannot originate data or non-delay sensitive calls on a roaming system before the P1 period expires.

Control flow begins in step 202 when an OOS condition occurs. The intention behind step 202 covers instances when going OOS from a home system. An OOS condition may occur when a device goes OOS from a home system at time T0, the device went OOS from a roaming system after camping on it, or the device cannot determine whether the user is in the home country and the device went OOS from a GSM/WCDMA system.

Control flow proceeds to step 204 where the UE determines if it is currently originating a voice call including emergency 911 or other delay sensitive call. If so, control flow proceeds to step 225 where the UE bypasses any waiting periods for re-acquisition of service. In step 225, the UE scans, acquires and provides service on either the home system or any roaming system as soon as either one becomes available. Otherwise, control flow proceeds to step 205 where the UE scans for selected preferred systems.

In steps 206-208, OOS wait periods are imposed before a roaming partner can be acquired. During the $P_3$ wait period, the UE scans for the home system in an attempt to re-acquire it before roaming is permitted. This time period is fixed, or dynamically configurable to provide more time/opportunities to re-acquire a home system before camping on a roaming system. In one exemplary embodiment, the time period is configurable by phone operators and can be adjusted in response to increases or decreases in accrued roaming charges by a carrier. In another exemplary embodiment, the operator may tune the time period parameter based on user's home location. If the user is in area where network coverage is known to be inconsistent or very reliable, the timer can be adjusted according to network coverage quality.

In step 206A and 206B, originations for data or non-delay-sensitive calls on a roaming system are prohibited for a wait period of time $P_1$ while the home network is scanned for re-availability, thus imposing a time window of $P_1$ wherein the UE cannot camp on a roaming system.

If the OOS was a transient condition and the home system is re-available, the user is returned to the home system in step 222. Scanning for the home system continues during wait period $P_3$. Control flow proceeds to step 208 unless the home system has been detected before the end of wait period $P_3$. With respect to the $P_1$ wait period, should the home system be detected during wait period $P_1$, control flow ends with the re-acquisition of the home system in step 222. In other words, if no delay sensitive applications are in use in step 204, control flow proceeds to step 205 where the wait periods $P_1$ and $P_3$ are invoked simultaneously/in parallel as soon as the UE goes OOS from a home system. Otherwise control flow proceeds directly to step 226. For example, if a voice call is being made by the user, no wait period is imposed and roaming charges will incurred from the most advantageous roaming partner available. However if an email or other data application is in the process of sending or receiving data, the non-delay sensitive wait period $P_1$ will be imposed in order to delay immediately incurring roaming charges.

In another exemplary embodiment, when the UE originates a voice (Including E911) or delay sensitive call in the midst of OOS, control flow proceeds directly to block 226 where service is provided on either the home system or any roaming system as soon as either one becomes available.

In step 208, during a second OOS wait period, $P_2$, the UE scans for the home system and only selected preferred roaming systems, rather than all systems. Selected preferred roaming systems may be determined by criteria such as preferred partners or other known criteria for wait period $P_2$. Scanning for preferred partner systems is performed according to a list of preferred roaming partners that is prioritized by the home system and may be dictated by the terms of partner roaming agreements. The home network has priority number one because the operator wants to direct the user to go there if it is available. The second priority is the least expensive roaming partner and so on to create a list of selected preferred systems, excluding systems that are faraway from home systems or the home from which the UE went OOS. Identification of less desirable, or un-preferred, partners is stored for future reference. If scanning faraway systems is not enabled, faraway system types will not be entered in the list.

After the list of available systems has been created in order of roaming agreement preference and an available roaming partner is detected in accordance with the list, the UE will check availability of more preferred systems (including the home system in 202) once to start with, and then continue to do this until the $P_1$ wait period expires per steps 216 and 218 so that the UE does not spend time in detecting a roaming partner any longer than necessary. Note that roaming systems that are less preferred than the currently detected roaming system may be removed from the list.

In one embodiment, the term "home system" comprises Verizon's systems in the US. The term "home country" comprises the United States (U.S.), and includes the Verizon "home system" as well as its roaming partners in the U.S. such as Sprint. "Faraway systems" in this embodiment may comprise GSM and WCDMA carriers in Europe, Asia, India and/or other continents. Other embodiments may comprise various home systems and home countries without departing from the scope of the invention.

In step 208, scanning for faraway systems is eliminated altogether. In step 208, a home indicator is tested to determine whether to skip scanning for faraway systems. If the home indicator indicates faraway system types are not existent in the geographical location of the user, faraway system type scanning is disabled. For example, CDMA networks and devices that allow global roaming include WCDMA and/or GSM capability in UEs. For some US carriers/operators, this capability is inutile, and therefore a waste of processing and power resources to search for WCDMA or GSM networks when the user is located in the US. If a user located in the US enters a tunnel or coverage is lost for some other reason and the home flag indicates non-home system types are non-existent, no scanning will be performed for WCDMA or GSM system types. A world-mode device going OOS from a home system will thus consume less power to reacquire service and provide faster re-acquisition time. When the home carriers strike roaming agreements with GSM/WCDMA carriers in the vicinity of a home country in the future, the carrier can enable non-home system type scanning via OTA service programming.

In one exemplary embodiment, a world phone from Verizon has roaming agreements with GSM/WCDMA carriers outside US but not with GSM/WCDMA carriers inside the US. The UE does not scan GSM/WCDMA when going OOS from US, but still scans US preferred roaming partners such as Sprint during this $P_2$ OOS wait period. In another exemplary embodiment, no roaming partners are scanned during the $P_2$ OOS wait period.

Control flow proceeds to step 210 unless the home system or a selected preferred roaming system has been acquired. If the home system or selected preferred roaming system is acquired before the end of time period $P_2$, control flow ends in the case of the home system. Note that wait period $P_1$ may run concurrently with the wait period $P_2$ for selected roaming systems. In an exemplary embodiment, $P_1$ may be greater than $P_2$.

In step 210, after OOS wait periods $P_2$ and $P_3$ have expired, the UE scans for all systems that can provide service. The UE continues scanning all systems until any system is detected. When a system is detected, control flow proceeds to step 212.

Step 212, determines whether the detected system is the home system or a roaming system. If the home system has been detected, control flow ends in step 222 with the re-acquisition of the home system. Otherwise, control flow proceeds to step 214.

In step 214, the detected roaming system is designated as the Baseline Detected Roaming System (BDRS). Control flow proceeds to step 216.

In step 216, scanning of all permissible systems more preferred than the BDRS is performed. Periodic scans of home system(s) is also performed. If no system more preferred than the BDRS is detected, control flow proceeds to step 218. Otherwise, control flow proceeds to step 224. Note that the BDRS is not scanned here.

In step 218, if wait period $P_1$ has not expired, control flow returns to step 216 to continue scanning for a home system or a system more preferred than the BDRS. This scanning continues until either the wait period $P_1$ has expired or a more preferred system is detected. If $P_1$ expires before a more preferred system is detected, control flow proceeds to step 220 where service is acquired from the BDSR. After at least one execution of step 218, the UE may camp on a roaming system.

In step 224, reached when a system more preferred than the BDSR has been detected, the detected system is determined to be either a home system or a more preferred roaming system than the BDRS. If the detected system is a home system, control flow ends in step 222 with the re-acquisition of the home system. Otherwise, control flow proceeds to step 227.

In step 227, the detected more preferred roaming system is designated as a New Detected Roaming System (NDRS), i.e., with BDSR=NDRS. The previously detected system or systems that are less preferred than the newly detected roaming system, may be deleted from the scanning list. In this manner, the scanning list may be dynamically adjusted. Control flow returns to step 218.

Figure 3:
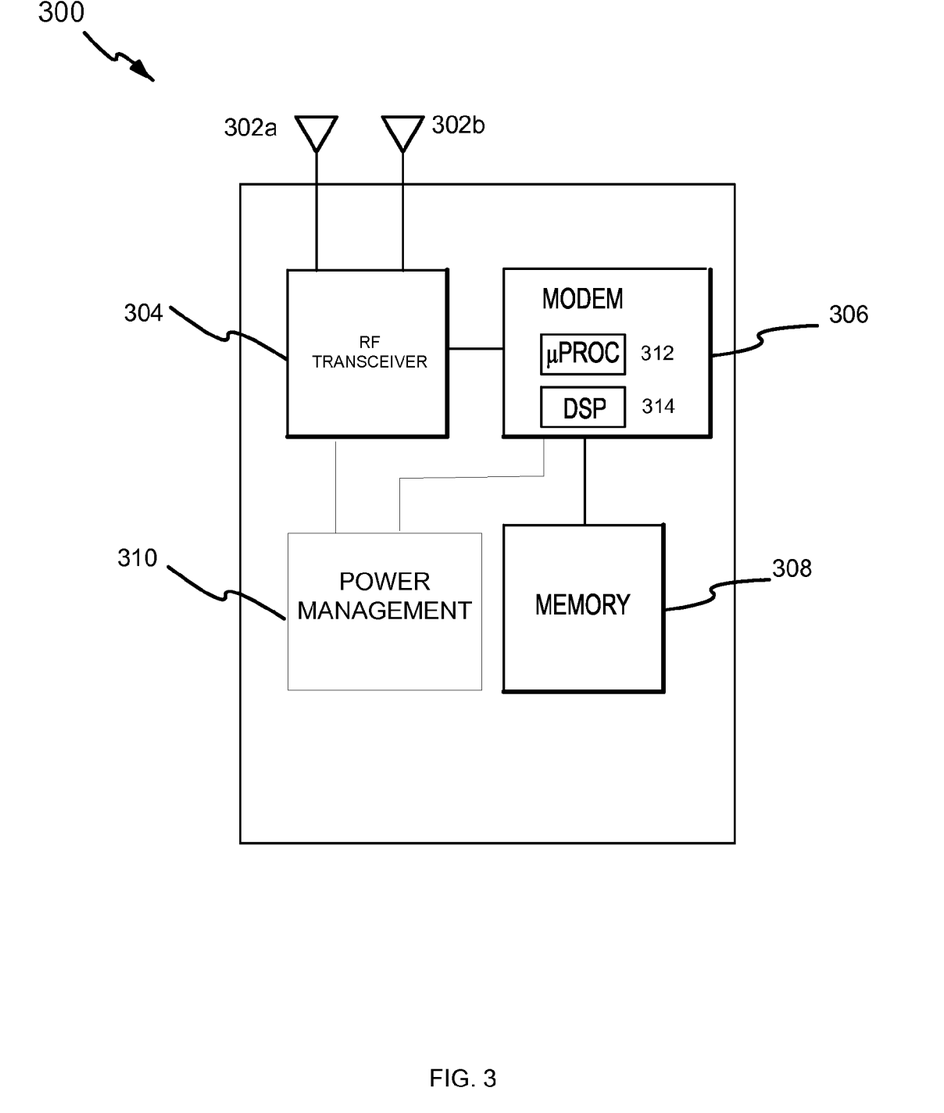
FIG. 3 is a block diagram illustrating an exemplary wireless device capable of World Mode Scanning Control.

FIG. 3 is a block diagram illustrating an exemplary wireless device capable of World mode scanning control 300. Wireless device 300 comprises a wireless communication transceiver 304 and associated antennas 302a, 302b capable of sending and receiving wireless communication signals. Modem 306 comprises the appropriate microprocessor(s) 312, digital signal processor(s) 314 and other suitable hardware, such as a correlator bank, for processing signals. Power management 310 controls power for various components of wireless device 300. Memory 308 is coupled to modem 304 as necessary for implementing various modem processes and functionality for single path detection and equalizer optimization. Wireless device 300 may comprise an appropriate user interface with alphanumeric keypad, display, microphone, speaker, and other necessary components (not shown). It will be appreciated by those skilled in the art that wireless device 300 may comprise a variety of components not shown.

Figure 4:
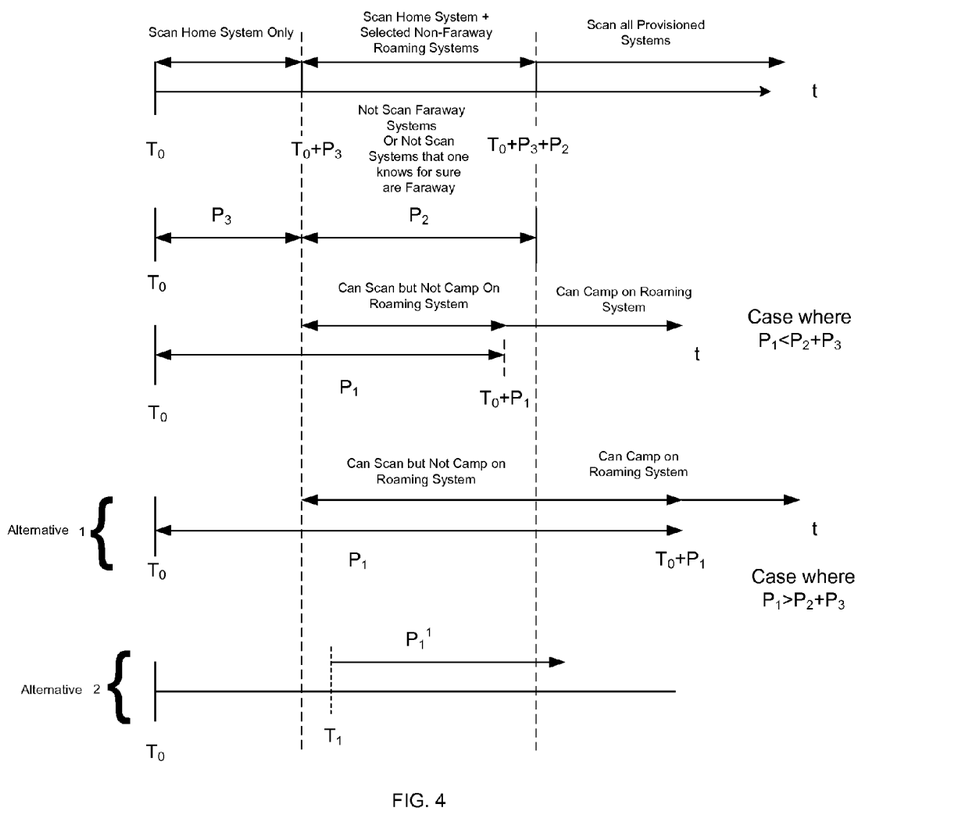
FIG. 4 illustrates a timing diagram showing a mode of operation.

FIG. 4 is a timing diagram showing one mode of operation according to the foregoing. With reference to FIG. 4, in connection with a UE attempted to acquire service, from time $T_0$ to time $T_0+$ time period $P_3$, the UE scans only for connection to a home system. Thereafter, for period $P_2$, from time $T_0+P_3$ to $T_0+P_3+P_2$, the UE scans for both home systems and selected non-faraway roaming systems. The non-faraway roaming systems may represent selected (i.e., preferred according to, for instance, a preexisting roaming agreement) detected systems which may appear on a list of preferred systems according to a prearranged roaming agreement. Entries on the list may be ranked according to various criteria or a criterion, e.g., cost. After time $T_0+P_3+P_2$, the UE scans for all provisioned systems, i.e., systems whether home, and regardless of whether the roaming system is preferred for roaming selection.

For a period of time $P_1$ the UE may scan but not camp (i.e., acquire and use, i.e., transmit and receive) on the roaming system. Therefore, during period $P_1$, the UE may not make non-delay sensitive calls on a roaming system and the UE is not allowed to originate data. $P_3$ represents a period of time during which the UE only scans for its home system after the UE "wakes up" or attempts to come back into service after being out of communication service. In connection with not finding the home system during period $P_3$, the UE scans, for time period $P_2$, for systems on which it may roam that are preferably on its preferred roaming list (PRL) and which are know not to be faraway. For instance, a roaming system in an overseas country may be on the PRL, but it resources will not be devoted to a scan searching for a system known to be out of range such as with the foregoing example. As mentioned above, after time periods $T_0+P_3+P_2$, all systems provisioned on the PRL are scanned and after the time period $T_0+P_1$ which may end before or after (shown as Alternative 1 in FIG. 4) time $T_0+P_3+P_2$, the UE is allowed to camp on a provisioned roaming system should one be available. Should the home system be detected, the UE is allowed to camp on the home system upon detection. However, in one embodiment, camping on a roaming system may not occur until after time period $P_1$ in connection with detection of a roaming system provisioned on the PRL.

The methodology for World Mode Scanning Control described herein may be implemented by suitable instructions operating on the microprocessor 312 and memory 308 of wireless device 300, but is certainly not limited to such an implementation and may alternatively be implemented in hardware circuitry. The microprocessor 312 is connected to power management 310 and memory 308 having code or instructions directing the microprocessor 512 to perform World mode scanning control. Memory 308 may comprise instructions for performing World Scanning Control. The memory 308 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 312 executes instructions stored in memory 508 according to the steps of FIG. 2 to perform World mode scanning control.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For instance, in one preferred embodiment, as shown as Alternative 2 in FIG. 4, a new $P_1^1$ wait period can be initiated in connection with detecting an available roaming system which is provisioned on a Preferred Roaming List. The $P_1^1$ functions similarly as that of wait period $P_1$ in that the UE is not allowed to camp on a roaming system (i.e., no data originations and no non-delay sensitive calls on a roaming system). Thus, the present invention is not intended to be limited to the embodiments shown herein but is to be accorded the widest scope consistent with the principles and novel features disclosed herein.

We claim:

1. A method for scanning for wireless communication service comprising:
    determining that a wireless device has gone Out Of Service from a home network system;
    delaying, for an Out Of Service wait time period, scanning for selected preferred roaming partners, while scanning for the home network system;
    further delaying, for a Non-Delay Sensitive time period, origination of non-delay sensitive calls when no time sensitive applications are in use; and
    re-acquiring service from the home network system if available.

2. A method for scanning for a wireless communication service in connection with a mobile device going out of service from a home network system comprising:
    scanning for the home network system and preferred roaming network systems using a list of preferred roaming partners while delaying scanning for network systems faraway from the home network system or current mobile device location for a first predetermined time period, and further prohibiting origination of non-delay sensitive calls for a second predetermined period wherein the second predetermined time period is coextensive with at least a portion of the first predetermined time period; and wherein service is acquired first from the home network system if available, and thereafter from a system of the highest priority roaming partner should the mobile not re-enter coverage of the home network.

3. The method of claim 2 wherein the home network has priority number one, the second priority is the least expensive roaming partner to create a list of available systems.

4. The method of claim 2 wherein re-scanning for the home system and preferred roaming systems that are more preferred than a detected roaming system is performed after service from a roaming partner has been detected and wherein the user is returned to the home network system should the mobile re-enter the home network system, the re-scanning being continued until an Out-of-Service time period has expired.

5. The method of claim 4 wherein the re-scanning occurs within a predetermined period of time, T1.

6. The method of claim 2 wherein re-scanning for the home system and preferred roaming systems that are more preferred than a detected roaming system is performed after service from a roaming partner has been detected and wherein an Out-of-Service wait period is initiated in connection with the detection of service from a roaming partner.

7. The method of claim 4 wherein the mobile device camps on the detected roaming system should a home system or more preferred roaming system not be detected.

8. The method of claim 2 wherein service is acquired from a higher priority selected preferred roaming partner than a Baseline Detected Roaming System if a service from a roaming partner having a higher selected preferred roaming partner priority than the Baseline Detected Roaming System becomes available.

9. A wireless receiver comprising:
a wireless communications transceiver and associated antenna(s) capable of sending and receiving wireless communications signals;
a modem coupled to the transceiver comprising processor(s) for processing signals and executing code stored in a memory;
a power management unit coupled to the modem and the transceiver for measuring and controlling transmit power; and
a memory coupled to the modem for storing instructions for determining that a wireless device has gone Out Of Service from a home network system, delaying, for an Out Of Service wait time period, further delaying, for a Non-Delay Sensitive time period, origination of non-delay sensitive calls when no time sensitive applications are in use; scanning for selected preferred roaming partners, while scanning for the home network system and re-acquiring service from the home network system if available.

10. The wireless receiver of claim 9 wherein scanning for systems other than the home system is delayed for a wait time period.

11. A non-transitory computer readable medium having instructions stored thereon to cause a processor in a wireless device to:
determine that a wireless device has gone Out Of Service from a home network system;
delay, for an Out Of Service wait time period, scanning for selected preferred roaming partners, while scanning for the home network system;
further delaying, for a Non-Delay Sensitive time period, origination of non-delay sensitive calls when no time sensitive applications are in use; and
re-acquire service from the home network system if available.

12. The non-transitory computer readable medium of claim 11 wherein scanning for systems other than the home system is delayed for a wait time period.

13. The non-transitory computer readable medium of claim 11 wherein the scanning comprises scanning for the home system and preferred selected systems using a list of preferred roaming partners that is prioritized by the home system according to terms of partner roaming agreements and wherein service is acquired first from the home network system if re-available, or from a system of the highest priority roaming partner available if the home network system does not become re-available.

14. The non-transitory computer readable medium of claim 13 wherein the home network has priority number one, the second priority is the least expensive roaming partner to create a list of available systems.

15. The non-transitory computer readable medium of claim 13 wherein periodic re-scanning for the home system is performed after service from a roaming partner has been detected and wherein the user is returned to the home network system if the home network system is re-available.

16. The non-transitory computer readable medium of claim 13 wherein service is acquired from a higher priority selected preferred roaming partner than a Baseline Detected Roaming System if a service from a roaming partner having a higher selected preferred roaming partner priority than the Baseline Detected Roaming System becomes available.

17. A means for scanning for wireless communication service comprising:
means for determining that a wireless device has gone Out Of Service from a home network system;
means for delaying, for an Out Of Service wait time period, scanning for selected preferred roaming partners, while scanning for the home network system means for further delaying, for a Non-Delay Sensitive time period, origination of non-delay sensitive calls when no time sensitive applications are in use; and
means for re-acquiring service from the home network system if available.

18. The means for scanning for wireless communication service of claim 17 wherein scanning for systems other than the home system is delayed for a wait time period.

19. The means for scanning for wireless communication service of claim 17 wherein the scanning comprises scanning for the home system and preferred selected systems using a list of preferred roaming partners that is prioritized by the home system according to terms of partner roaming agreements and wherein service is acquired first from the home network system if re-available, or from a system of the highest priority roaming partner available if the home network system does not become re-available.

20. The means for scanning for wireless communication service of claim 19 wherein the home network has priority number one, the second priority is the least expensive roaming partner to create a list of available systems.

21. The means for scanning for wireless communication service of claim 19 wherein periodic re-scanning for the home system is performed after service from a roaming partner has been detected and wherein the user is returned to the home network system if the home network system is re-available.

22. The means for scanning for wireless communication service of claim 19 wherein service is acquired from a higher priority selected preferred roaming partner than a Baseline Detected Roaming System if a service from a roaming partner having a higher selected preferred roaming partner priority than the Baseline Detected Roaming System becomes available.

* * * * *